Figure 1:
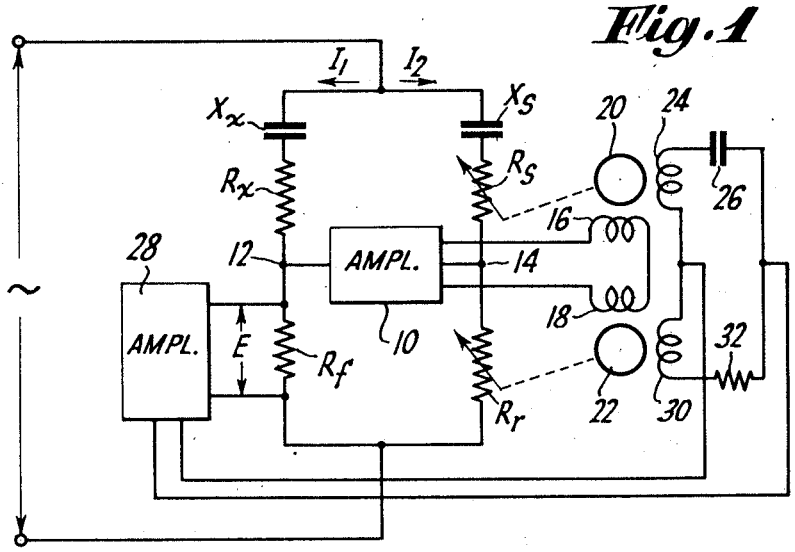

May 19, 1953        C. R. SCHAFER        2,639,411
ALTERNATING-CURRENT BRIDGE

Filed July 8, 1950                         3 Sheets-Sheet 1

INVENTOR
CURTISS R. SCHAFER
BY
Paul S. Martin
ATTORNEY

May 19, 1953  C. R. SCHAFER  2,639,411
ALTERNATING-CURRENT BRIDGE
Filed July 8, 1950  3 Sheets-Sheet 2
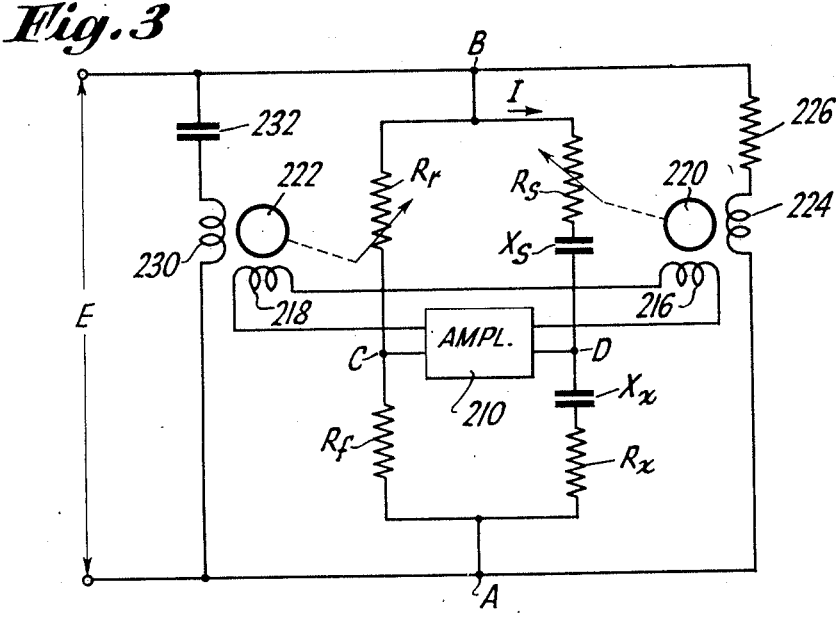
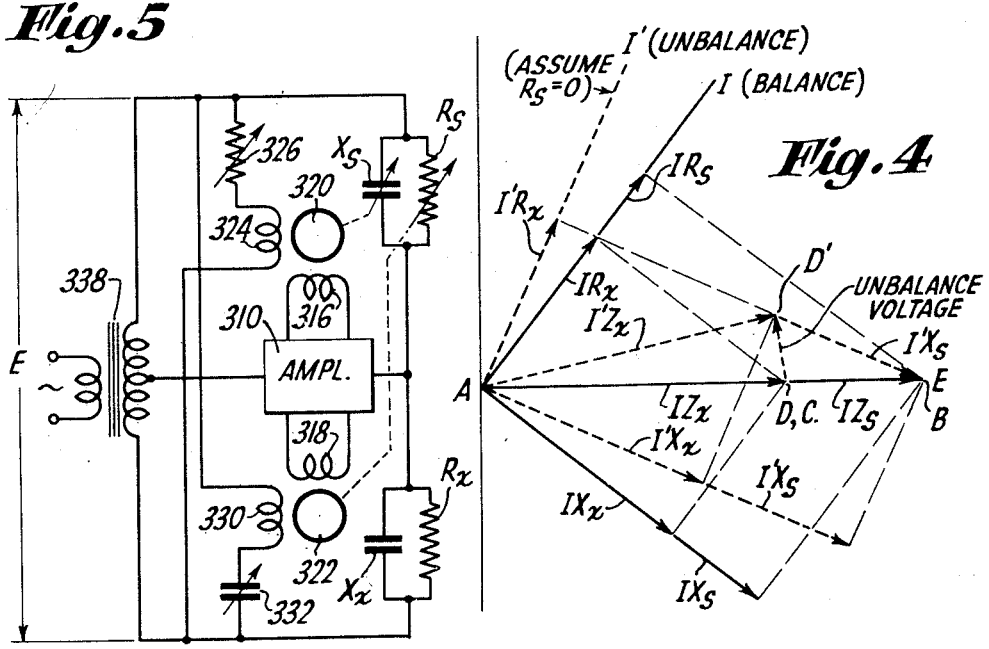
INVENTOR
CURTISS R. SCHAFER
BY Paul S. Martin
ATTORNEY Patented May 19, 1953

2,639,411

UNITED STATES PATENT OFFICE 2,639,411

ALTERNATING-CURRENT BRIDGE

Curtiss R. Schafer, Ridgefield, Conn.

Application July 8, 1950, Serial No. 172,678

11 Claims. (Cl. 318—19)

1

The present invention relates to alternating current circuits, more particularly to impedance and potential bridges, and to related methods. In these bridges, a potential is impressed on two impedances to be compared, which are joined in series, and a null or balance indicator at the junction of these impedances is also connected to a reference point. This reference point is either a tap in the potential source itself or the junction of two additional series-connected impedances in the true four-arm impedance bridge. It will be apparent to those skilled in the art that aspects of the invention apply to the self-balancing potential bridge or potentiometer, and to more elaborate forms of impedance bridges, but the illustrative description will deal with various forms of four-arm bridges.

An object of this invention is to facilitate the balancing of alternating-current bridges, and a further object is to provide for the automatic balancing or self-balancing of alternating-current bridges.

Direct-current forms of bridges, the potential bridge and the Wheatstone bridge, have long been made self-balancing. There, a single motor with its control circuit automatically restores balance of the bridge due to a resistor to be measured by adjusting another resistor. In using bridge circuits for measuring alternating-current impedances, the known impedance having an unknown ratio of resistance-to-reactance is manually balanced against complex impedance components. Here, two adjustments are required for eliminating the unbalance voltage. In one known arrangement, the two adjustments include one adjustment to establish the proper ratio of resistance to reactance within a "standard" arm of the bridge, and a second adjustment to establish the proper impedance ratios of the arms of the bridge. Balancing the known form of impedance bridge involves a cut-and-try procedure in which first one and then the other adjustment is attempted and the balance is progressively improved.

In one aspect, the present invention provides an alternating-current bridge with detecting means separately responsive to the different components of unbalance voltage so as to facilitate direct balancing, and this is extended to provide a self-balancing circuit and mechanism in which the separately responsive indicators assume the form of motors. In the following detailed disclosure of several illustrative novel bridges, the complex components of the unbalance voltage of the bridge are utilized separately to control the

2 adjustment of two impedances. In one example, the result is to adjust the ratio of resistance to reactance in a "standard" arm so as to equal that of the unknown arm, and to equalize the ratios of the arms of the bridge.

The problem of automatically achieving balance is facilitated in one embodiment by utilizing the voltage drop across one arm of the bridge as a reference. In advantageous alternative forms, where two arms having equal loss factors (as two resistors) are connected in series to the alternating current energizing source, the source itself is used as a reference.

An impedance bridge can be made wholly self-balancing or only partially self-balancing. Only one component of unbalance may be of interest; but it nevertheless is desirable to consider the other component which, if ignored or left unbalanced, might introduce spurious effects and upset the proper measurement of the component that is of interest. In measuring liquid levels in a tank, for example, changing capacitance of a partially or wholly immersed pair of gaging condenser plates can be used as a measure of the level; but the leakage resistance is taken into account in applying the present invention by making the unbalance responsive means separately responsive to the separate components of the unbalance voltage and not to the total magnitude thereof.

The nature of the invention will be more readily appreciated, together with its various further features of novelty, from the following detailed disclosure of several illustrative embodiments. In the accompanying drawings, Figs. 1–3, 5 and 6 are wiring diagrams, partly in block-diagram form, of several self-balancing impedance bridges variously embodying broad aspects of the invention; and Fig. 4 is a vector diagram demonstrating the self-balancing process of the form of bridge in Fig. 3.

The several illustrative forms of four-arm bridges in Figs. 1–3, 5 and 6 include two parallel branches of a circuit connected to an alternating current source. They all include an unbalance detector separately controlling a pair of motors for maintaining balance of the bridge by responding separately to two unbalance components. The unbalance detector and motive means include phase sensitive devices that operate or are idle in dependance upon the phase of the unbalance voltage in relation to a particular reference voltage. This reference voltage is the drop across one arm of the bridge, a voltage consistently in phase with that drop. Where two arms are connected in series across the input alternating-current terminals, and these arms are of like loss factor, the voltage at their junction remains in phase with the source voltage despite changes in their ratio and consequently the source can be used as a reference. The same result obtains for potential bridges, wherein the characteristics of the different sections separated by a fixed or adjustable tap are alike.

An impedance bridge of two parallel branches appears in Fig. 1. One branch includes an unknown impedance such as a liquid level gage capacitor having a reactive component $X_x$ and a resistive component $R_x$, this unknown impedance being connected in series with a fixed resistor $R_f$. The other parallel branch of the bridge includes a standard reactor $X_s$ of virtually pure reactance in series with a resistor $R_s$ calibrated in terms of merit or loss factor. This combined standard impedance $R_s$ plus $X_s$ is connected in series with an adjustable calibrated resistor $R_r$ that is used for adjusting the ratio of the bridge arms. An unbalance detector including an amplifier 10 is connected at its input between the diagonal terminals of the bridge 12 and 14, with the amplifier output arranged to energize windings 16 and 18 of a pair of two-phase motors 20 and 22 that are phase-sensitive, responding only to quadrature voltages to the separate windings. The second winding 24 of motor 20 is connected through a capacitor 26 to a source of reference voltage E through isolating amplifier 28 while the second winding 30 of motor 22 is energized by the same reference source E through a resistor 32. Source E is the voltage drop across fixed resistive arm $R_f$ of the bridge. Capacitor 26 and resistor 32 insure operation of motors 20 and 22 in response to the real and reactive components, respectively, of the unbalance voltage.

Manifestly the bridge can be balanced by properly adjusting $R_s$ in relation to $X_s$ so as to have the same merit ratio or loss factor as that of the unknown impedance represented by $X_x$ and $R_x$, and adjusting ratio arm $R_r$ so that $X_x$ is to $R_f$ as $X_s$ is to $R_r$. In Fig. 1 the current drawn by the two parallel circuits from the alternating current source that energizes the bridge is not in phase with the bridge applied voltage. The phase angle of this current changes with changing values of unknown impedance. Nevertheless, the bridge is automatically balanced by a mechanical coupling of motor 20 to resistor $R_s$ (represented by dotted lines) and a mechanical coupling of motor 22 to resistor $R_r$.

Motor 20 has its winding 24 energized in quadrature to voltage E, whereas motor 22 has its winding 30 energized in phase with voltage E, by virtue of phasing capacitor 26 and resistor 32, respectively. Consequently, motor 20 will be activated only if the output of amplifier 10 has a component in phase with voltage E and motor 22 will operate only if there is a quadrature component in the output of amplifier 10. Operation of motor 20 adjusts resistor $R_s$ through reduction gearing, not shown, so that the phase angle of the current in that one of the two parallel circuits approaches the same phase angle as that in the parallel circuit that includes the unknown impedance. Adjustment of ratio resistor $R_r$ has the primary effect of matching the amplitude of its voltage drop to that across resistor $R_f$. As the bridge approaches balance, adjustment of the ratio of $R_r$ to $R_f$ will have little effect in changing the phase of the current in its circuit, whereas adjustment of resistor $R_s$ will have little effect in upsetting the near-balance of the impedance ratios of the two arms of the bridge. These effects depend somewhat on the relative values of the resistances and the reactances. The circuit rebalancing arrangement shown is preferably proportioned so that $R_f$ and $R_r$ are smaller than $R_x$ and $R_s$.

There is of course the possibility that only the reactance or only the effective resistance may be of interest and hence only one calibration need be provided. Nevertheless both adjustments are desired to establish full balance. Were a large unbalance voltage component ignored, the amplifier would be overloaded.

Figure 2:
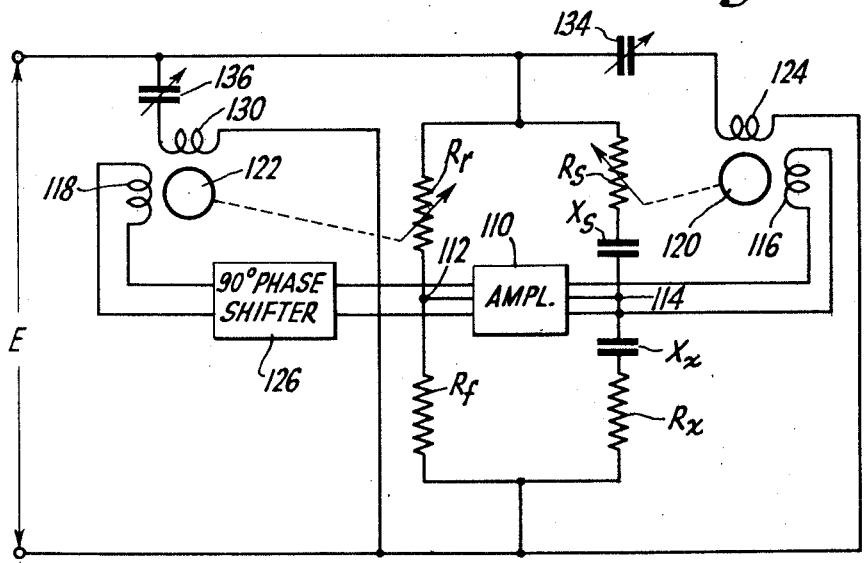

In Fig. 2 another form of the invention is illustrated in which the two resistors $R_f$ and $R_r$ are connected in adjacent arms, as in Fig. 1. However in Fig. 2 these resistors are connected in series to the alternating current source, and this source is used as the voltage reference E. Just as in Fig. 1, complex impedance $X_x$ and $R_x$ has an unknown ratio of reactance to resistance, and a virtually pure reactor $X_s$ in the fourth arm of the bridge has an adjustable resistor $R_s$ to establish the same ratio of reactance to resistance or loss factor. The two motors 120 and 122 have their respective windings 116 and 124, and 118 and 130, energized respectively by the bridge energizing source and by the unbalance diagonal of the bridge. In the present instance, however, the complex voltage derived through amplifier 110 from the unbalance diagonal is applied directly to winding 116 and through a 90° phase shifter 126 to winding 118. The windings 124 and 130 are energized essentially in phase (rather than in quadrature as in Fig. 1) but suitable compensation for incidental phase-shifts is provided in the form of adjustable phasing impedances, as for example, capacitors 134 and 136.

Regardless of the ratio of resistors $R_r$ and $R_f$ in Fig. 2, the current in these arms remains fixed in phase with each other and with the source (even when the bridge is not balanced) and therefore the energizing source can be used as the voltage reference to avoid an isolating amplifier such as amplifier 28 in Fig. 1. Phase shifter 126 corresponds substantially to phase-shifting components 26 and 32 in Fig. 1. Comparison of Figs. 1 and 2 in this detail shows that the two motors can be arranged for control by phase-split components of the unbalance voltage just as by the mutually phase-shifted components of the reference source of voltage.

Fig. 3 is a further modification in which the bridge made up of ratio resistor $R_r$, fixed resistor $R_f$, unknown impedance $X_x$ plus $R_x$, and the fourth arm including virtually pure standard reactor $X_s$ and adjustable resistor $R_s$. Motors 220 and 222 have their windings 216 and 218 energized in like phase by amplifier 210 across the unbalance diagonal of the bridge while windings 224 and 230 are energized in quadrature by the alternating current source that also energized the bridge, constituting voltage reference E, through phasing resistor 226 and capacitor 232, respectively. The terminals of the voltage source may be designated A and B and the unbalance diagonal may be designated C and D. The voltage at terminal C between resistors $R_r$ and $R_f$ remains at all times in phase with source E. A vector diagram appears in Fig. 4 that is related particularly to Fig. 3 but its bearing in respect to the other bridges will be readily apparent.

The voltage E is applied between terminals A and B as indicated in Fig. 4. When the bridge is balanced, the voltage at D is the same in magnitude and phase as that at C and is therefore in phase with voltage A—B. Voltage A—D is constituted of the complex components $IX_x$ and $IR_x$, whereas the voltage D—B is the complex sum of voltages $IX_s$ and $IR_s$ (where I is the current through these series impedances).

Next it may be assumed that the bridge is unbalanced by reducing loss-factor resistor $R_s$ to zero. Current I' through the reactive arms of the bridge during unbalance leads the former balance current I. The voltage AD' is the impedance drop $I'Z_x$ that is constituted of $I'X_x$ and $I'R_x$. The voltage $I'X_s$ when added to $I'Z_x$ yields voltage E. The unbalance voltage is essentially in quadrature to reference voltage E and therefore only motor 220 responds. Motor 222, the windings 218 and 230 of which are energized in phase in this condition, remains idle while resistor $R_s$ is adjusted to its proper value. This adjustment introduces some change in the ratio of the reactive arms of the bridge and it should therefore be expected that motor 222 will react somewhat to the adjustment effected by motor 220.

If resistor $R_r$ were greatly reduced and resistor $R_s$ were assumed to be adjusted properly to give the same loss factor in its arm as is produced in the unknown arm, there would be no large quadrature voltage in the unbalance diagonal, and therefore motor 220 would be virtually idle while motor 222 would operate to correct the unbalance. With improper settings of both adjustable resistors $R_r$ and $R_s$, both motors operate toward rebalance because of the real and reactive components in the unbalance diagonal of the bridge to which they are separately responsive. No complicating consideration is devoted here to the ancillary problem of hunting in the region of minor misadjustment of both variables, except to note that this problem is minimized by the choice of the proper reference voltage in accordance with this invention.

In Fig. 5 a further illustrative embodiment is shown in which a tapped secondary winding 338 provides the reference voltage E, the voltage at the tap being in phase with that across the secondary terminals, just as in the case of resistors $R_r$ and $R_f$ in Figs. 2 and 3. This tap might be made adjustable for adjusting the impedance ratio of the bridge arms (an additional adjustment for loss factor being provided in one of the other arms) but another arrangement is shown. A capacitor (such as a gaging capacitor) of unknown impedance represented as capacitive reactance $\bar{X}_x$ and loss resistance $R_x$ is balanced by adjustment of resistor $R_s$ and a variable capacitor having reactance $X_s$ in the adjoining arm. The complex current drawn by the parallel resistor-and-capacitor in each of the adjoining bridge arms of Fig. 5 is of the same character (depending on the impedance values) as in the bridge of Fig. 3.

The phase-sensitive unbalance detector including amplifier 310 and phase-sensitive motors 320 and 322 operates in Fig. 5 to restore balance of the bridge in the event that impedance $X_x$ plus $R_x$ should change, just as in the previous embodiments. Amplifier 310 energizes phase windings 316 and 318 of the two motors in like phase, whereas phase windings 324 and 330 are energized 90 degrees apart by virtue of phasing resistor 326 and capacitor 332. Minor errors in phasing can be taken into account in the amplifier connections and by other expedients understood by those skilled in the art.

Figure 6:
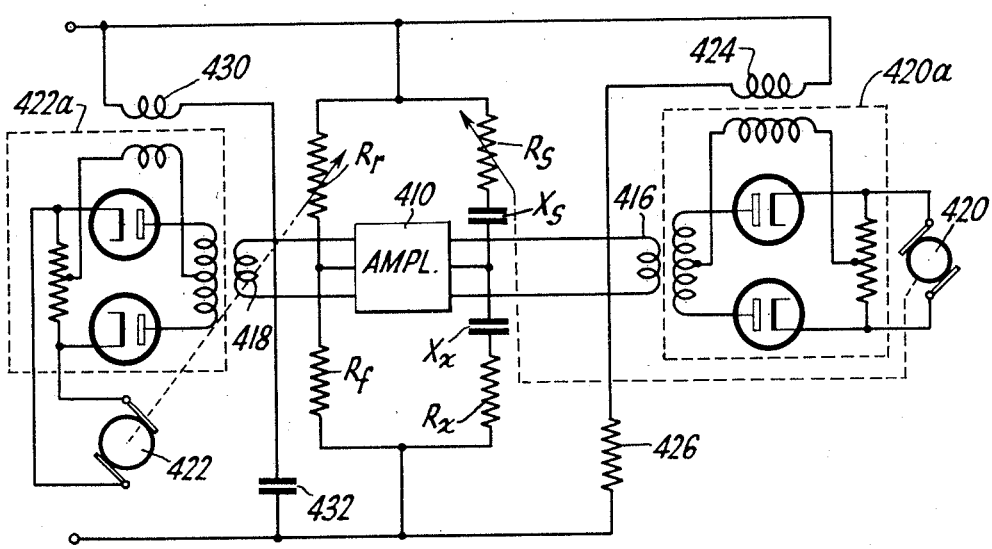

Another form of phase-sensitive unbalance detector is illustrated in the self-balancing bridge of Fig. 6, showing that in broad aspect the invention does not necessarily depend upon two-phase motors. A bridge having the same components as in Fig. 3 is shown wherein resistor $R_s$ is adjusted by a shunt direct-current motor 420 and resistor $R_r$ is adjusted by a like direct-current motor 422, each via amplifier 410 or amplifiers. Motor 420 is controlled by a phase bridge 420a having phase windings 416 and 424 corresponding to the motor windings in Fig. 3, the motor and phase bridge constituting a phase-sensitive device like motor 20. Resistor 426 insures motor 420 of operating only for quadrature unbalance components, and the motor itself will operate in the right direction for rebalance on the polarity of the phase bridge output. Phase winding 418 connected to amplifier 410 and phase winding 430 connected through phasing capacitor 432 to the alternating current terminals of the bridge control motor 422 through its phase bridge 422a to adjust resistor $R_r$.

The foregoing bridges are all adaptable to the ideal measurement of liquid level, by using large plates, immersed in the liquid to the extent of the level, as the unknown complex impedance represented in Figs. 1–3, 5 and 6 as $R_x$ and $X_x$. The capacitance changes with different levels due to changing cross-sectional areas of the vertically disposed plates submerged in the liquid which has a dielectric factor greater than air. These bridges have the further feature of taking into account the fact that the liquid has a significant leakage resistance. In known level gages using capacitors, the leakage current is improperly ignored.

Certain variations and applications of the foregoing embodiments of the invention will occur to those skilled in the art from the foregoing specification, and therefore the appended claims should be accorded a latitude of interpretation, consistent with the spirit and scope of the invention.

What is claimed is:

1. An alternating current bridge including a network of resistive and reactive impedances, said network having a pair of alternating-current energizing terminals and a pair of unbalance-voltage output terminals, phase-sensitive detecting means connected to said unbalance-voltage output terminals, said phase-sensitive means including reference-voltage connections to terminals of said bridge in phase with the voltage between one of said input terminals and one of said output terminals.

2. A self-balancing bridge including a network of impedances having a pair of alternating-current energizing terminals and a pair of unbalance voltage output terminals, in combination with phase-sensitive detecting means connected to said unbalance terminals, said detecting means also including reference-voltage connections to terminals of said bridge in phase with the voltage across one arm of said bridge, said unbalance detecting means including two motors respectively responsive to in-phase and quadrature components of the unbalance voltage relative to the reference voltage for rebalancing the bridge.

3. An alternating-current bridge including a network of resistive and reactive impedances, having a pair of alternating-current energizing terminals and a pair of unbalance-voltage output terminals in combination with means for deriving a reference voltage in phase with the voltage between one of said energizing terminals and one of said output terminals, and phase-sensitive detecting means connected to said unbalance-voltage output terminals and to said reference-voltage deriving means, said phase sensitive means including portions separately responsive to voltage components in phase with and in quadrature with the reference voltage.

4. An alternating current bridge including a four-armed network of resistive and reactive impedances, having a pair of alternating current input terminals and a pair of unbalance-voltage output terminals, an isolating means for deriving a reference voltage having energizing connections to one of the bridge arms, and phase-sensitive unbalance detecting means connected to said reference voltage deriving means and to said unbalance-voltage terminals, said detecting means including devices separately responsive to the in-phase component and the quadrature component of the unbalance voltage relative to the reference voltage.

5. An alternating current bridge including a four-armed network having a pair of alternating-current input terminals and a pair of unbalance-voltage output terminals, said network having purely resistive impedances in two adjacent arms and complex impedances in the other two arms of the network, means for deriving reference voltage in phase with the voltage drop in one of said resistive impedances, and a phase-sensitive detector connected to said output terminals and to said reference-voltage deriving means and having portions separately responsive to in-phase and quadrature components of the unbalance voltage.

6. A self-balancing impedance bridge including a four-armed network having a pair of alternating current input terminals and a pair of unbalance-voltage output terminals, said network having purely resistive impedances in adjacent arms of said network, the other two arms of said network having complex impedances, two of said impedances being adjustable for establishing ratio balance among said arms and for establishing loss-factor balance between said complex impedances, respectively, means for deriving a reference voltage in phase with one of said resistive arms, and phase-sensitive unbalance voltage detecting means connected to said output terminals and to said reference-voltage deriving means, said detecting means including two motors being mechanically coupled to said adjustable impedances and being responsive separately to in-phase and quadrature components of the unbalance voltage.

7. An alternating current bridge including a pair of alternating-current input terminals, two parallel branch circuits between said input terminals, one of said branch circuits including series-connected components having substantially equal ratios of resistance to reactance and affording an unbalance-voltage output terminal at their connection, the other of said branch circuits including a pair of complex impedance arms connected in series and affording a second unbalance-voltage output terminal at their connection, phase-sensitive detecting means having two phases connected respectively to said alternating-current input terminals and to said unbalance-voltage terminals and having separate portions responsive respectively to the in-phase and the quadrature components of the unbalance voltage.

8. An alternating current bridge in accordance with claim 7 wherein said one of said branch circuits consists of two purely resistive branches.

9. An alternating current bridge in accordance with claim 7 wherein said one of said branch circuits is a tapped transformer winding.

10. A self-balancing bridge including two resistors of adjustable ratio connected in series to constitute two bridge arms, a reactor and an adjustable resistor connected in series as a third arm, and a complex reactor as the fourth arm of the bridge, said arms being connected together and providing four terminals, means for deriving a reference voltage in phase with one of said resistors, a phase-sensitive unbalance detector having input connections to two diagonally opposite bridge terminals and to said reference voltage means, and the remaining two bridge terminals constituting alternating current input terminals, said unbalance detector including two motors, one motor being operable in response to the quadrature component of the unbalance voltage relative to the reference voltage to adjust said adjustable resistor, and the other motor being operable in response to the in-phase component of the unbalance voltage to adjust the ratio of said bridge arms.

11. A partially self-balancing bridge including two series-connected arms connected to alternating-current terminals, said arms being of like characteristics so that the voltage across each is in phase with the voltage across both, two complex impedances connected in series to said alternating current terminals, an unbalance detector including a phase-responsive device including motive means energized by the alternating-current input voltage and the unbalance voltage and phased to respond to only one component thereof, and an impedance in one of said complex impedance arms coupled to said motive means for balancing that component of the unbalance voltage.

CURTISS R. SCHAFER.

No references cited.